US008222848B2

United States Patent
Poisson

(10) Patent No.: US 8,222,848 B2
(45) Date of Patent: Jul. 17, 2012

(54) TIME DELAY CONTACTOR FOR AIRCRAFT APU STARTER

(75) Inventor: Richard A. Poisson, Avon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 0 days.

(21) Appl. No.: 12/959,471

(22) Filed: Dec. 3, 2010

(65) Prior Publication Data

US 2011/0304158 A1    Dec. 15, 2011

Related U.S. Application Data

(63) Continuation-in-part of application No. 12/815,515, filed on Jun. 15, 2010.

(51) Int. Cl.
*H02P 1/04* (2006.01)

(52) U.S. Cl. ....... 318/430; 180/270; 180/279; 307/10.6; 477/167

(58) Field of Classification Search .............. 318/400.01, 318/701, 430, 432, 400.13, 400.06; 477/166, 477/167, 169, 171, 179; 180/270, 279; 60/39.14; 417/10; 307/10.6

See application file for complete search history.

(56) References Cited

U.S. PATENT DOCUMENTS

| 4,901,690 | A | * | 2/1990 | Cummins et al. ........... 123/179.3 |
| 5,899,411 | A | | 5/1999 | Latos et al. |
| 5,977,645 | A | | 11/1999 | Glennon |
| 6,462,429 | B1 | | 10/2002 | Dhyanchand et al. |
| 6,777,822 | B1 | | 8/2004 | Suttie et al. |
| 7,253,535 | B2 | | 8/2007 | Duesterhoeft |
| 7,448,220 | B2 | | 11/2008 | Schmidt et al. |
| 7,638,890 | B2 | | 12/2009 | Lando et al. |
| 7,840,333 | B2 | | 11/2010 | Mehrer et al. |
| 8,110,939 | B2 | * | 2/2012 | Itou ............................ 307/10.6 |
| 2010/0264670 | A1 | * | 10/2010 | Usami et al. ................ 290/38 R |

* cited by examiner

*Primary Examiner* — Walter Benson
*Assistant Examiner* — Antony M Paul
(74) *Attorney, Agent, or Firm* — Cantor Colburn LLP

(57) ABSTRACT

A starter for an auxiliary power unit includes a direct current motor operably connectable to an auxiliary power unit. A clutch is arranged in an electrically parallel relationship and configured to operably connect the motor to the auxiliary power unit when engaged, the motor and the clutch powered by a common input line. A time delay switching element is located and configured to delay power delivery to the direct current motor thus providing for full engagement of the clutch prior to initiation of rotation of the motor.

17 Claims, 3 Drawing Sheets

TIME DELAY CONTACTOR FOR AIRCRAFT APU STARTER

CROSS REFERENCE TO RELATED APPLICATIONS

This application is a continuation-in-part application of U.S. patent application Ser. No. 12/815,515, filed Jun. 15, 2010, the entire contents of which are incorporated herein by reference.

BACKGROUND OF THE INVENTION

The subject matter disclosed herein relates to an auxiliary power unit (APU) for aircraft. More specifically, the subject disclosure relates to a starter motor for an APU.

An APU is utilized in an aircraft primarily to provide power to start the engines. Aircraft engines have large heavy rotors that must be accelerated to a high rotational speed in order to provide sufficient air compression for self-sustaining operation. An APU solves this problem by powering up the aircraft in two stages. The APU is started by an APU starter, which is a DC electric motor with power supplied by a battery, accumulator, or external power source such as a ground power unit. Once the APU accelerates to full speed, it can provide enough power to start the aircraft's main engines, either by turning an electrical generator or a hydraulic pump, or by providing compressed air to the air turbine of the starter motor.

When starting the APU, power is supplied to the DC motor and a clutch which engages the APU to begin its operation. Typically, power is supplied to the DC motor and the clutch from the same electrical line, so that when the DC motor is activated, the clutch is simultaneously activated. The result is that the DC motor accelerates to speed before the clutch is completely engaged, and causing a high torque shock on a starter shaft when the clutch engages the shaft. The torque shock can cause damage and/or breakage of the shaft. The art would well receive an APU starter configuration which alleviates the torque shock and reduces damage and/or breakage of the starter shaft when the clutch is engaged.

BRIEF DESCRIPTION OF THE INVENTION

According to one aspect of the invention, a starter for an auxiliary power unit includes a direct current motor operably connectable to an auxiliary power unit. A clutch is arranged in an electrically parallel relationship and configured to operably connect the motor to the auxiliary power unit when engaged, the motor and the clutch powered by a common input line. A time delay switching element is located and configured to delay electrical current delivery to the motor thus providing for full engagement of the clutch prior to initiation of rotation of the motor.

According to another aspect of the invention, a method of starting an auxiliary power unit includes providing a flow of electrical current to a clutch of a starter. The clutch is fully engaged via the flow of current, thus operably connecting the direct current motor to the auxiliary power unit. A time-delayed flow of electrical current is provided to a direct current motor of the starter located such that it shares a common input line with the clutch. The direct current motor is accelerated via the time-delayed flow of current, and rotational energy is transferred from the direct current motor to the auxiliary power unit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
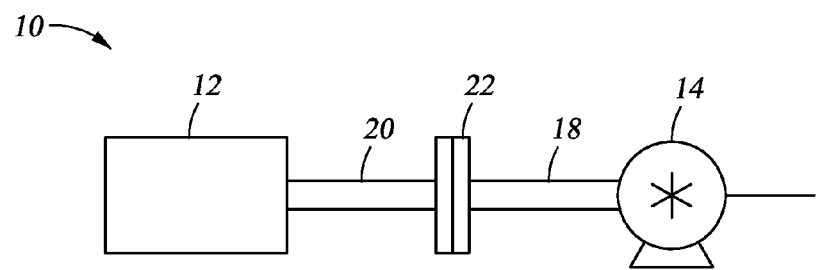
FIG. 1 is a schematic view of an embodiment of a starter for a auxiliary power unit.

Shown in FIG. 1 is a schematic of a starter 10 for an auxiliary power unit (APU) 12. The starter 10 includes an electric motor, for example, a direct current (DC) motor 14 and a motor shaft 18 extending therefrom. A starter shaft 20 extends from the APU 12 and is connectable to the motor shaft 18 via a clutch 22. When the clutch 22 is disengaged, rotational energy is transferred from the DC motor 14, through the motor shaft 18 and starter shaft 20, and to the APU 12.

Figure 2:
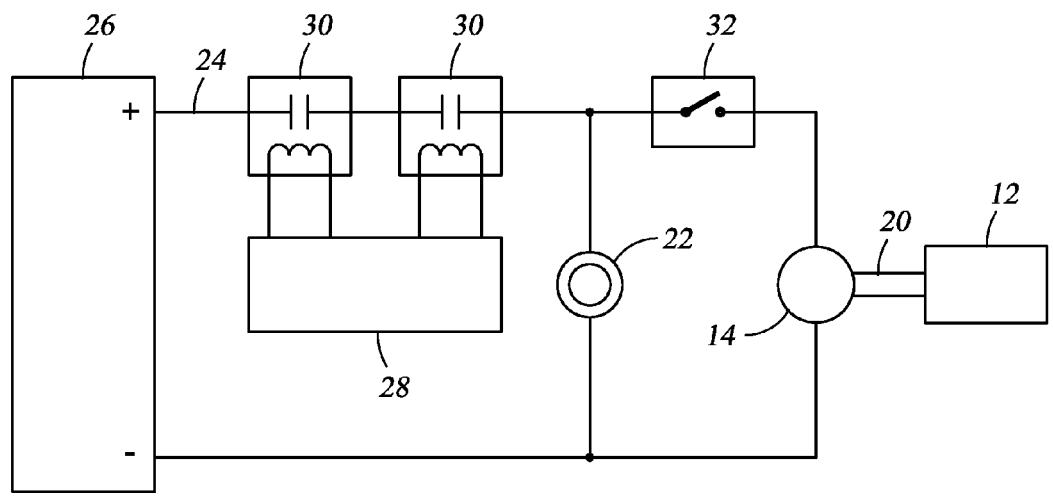
FIG. 2 is an electrical schematic view of an embodiment of a starter for an auxiliary power unit.

Referring now to FIG. 2, the DC motor 14 and the clutch 22 are arranged in an electrically parallel relationship and are powered by a common input line 24 from a power supply 26. An APU controller 28 controls a flow of current through the input line 24 via signals to one or more contactors 30. When the DC motor 14 is powered by the input line 24, the DC motor 14 accelerates up to a desired rotational speed. Similarly, when the clutch 22 is powered by the input line 24, the clutch 22 operably connects a starter shaft 20 to the motor shaft 18 thus enabling the transfer of rotational energy from the DC motor 14 to the APU 12.

Located between the DC motor 14 and the clutch 22, in a series relationship with the DC motor 14 is a time delay switching element, for example, a relay 32. When current passes through the input line 24 to the relay 32, time delay control electronics that drive the relay 32 are activated, thus initiating a time delay, before the current flows to the DC motor 14. The time delay effect of the relay 32 allows the clutch 22 to fully engage prior to initiation of acceleration of the DC motor 14 thus reducing torque shock when the clutch 22 is engaged.

Figure 3:
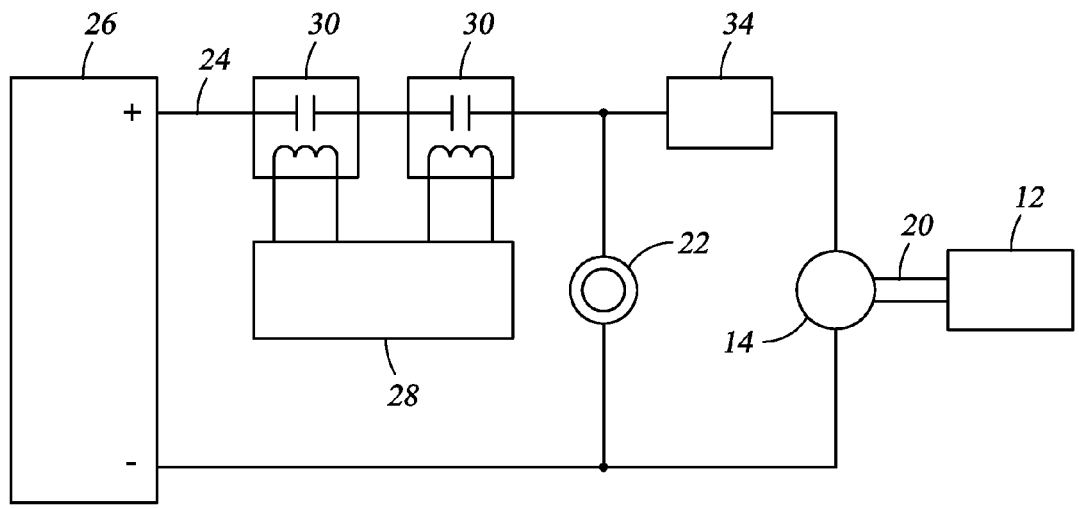
FIG. 3 is an electrical schematic view of another embodiment of a starter for an auxiliary power unit.

Referring now to FIG. 3, other embodiments include a metal-oxide-semiconductor field-effect transistor (MOSFET) 34 which acts as the time delay switching element. The MOSFET 34 is arranged in a serial relationship with the DC motor 14. When current passes through the input line 24 to the MOSFET 34, time delay control electronics that drive the MOSFET 34 are activated, thus initiating a time delay, before the current proceeds to the DC motor 14. The time delay effect of the MOSFET 34 allows the clutch 22 to fully engage prior to initiation of acceleration of the DC motor 14.

Figure 4:
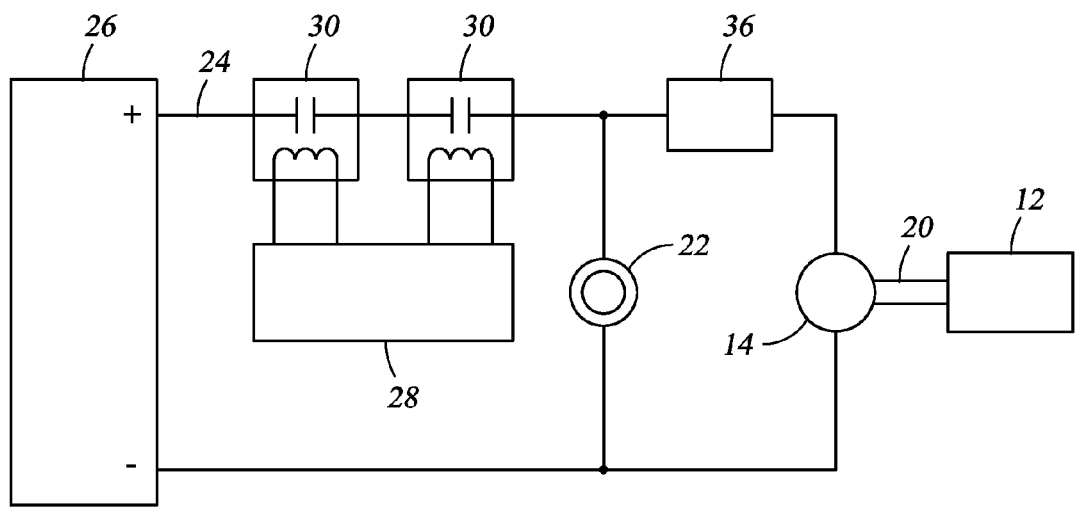
FIG. 4 is an electrical schematic view of yet another embodiment of a starter for an auxiliary power unit.

Referring now to FIG. 4, some embodiments of starter 10 include a switching element which is a thyristor 36. As above regarding the relay 32 and the MOSFET 34, when current is delivered to the thyristor 36 via the input line 24, a time delay is initiated via the time delay control electronics that drive the thyristor 36. Once the thyristor 36 is triggered, it will continue to conduct, or provide current to the DC motor 14 until the voltage across the thyristor 36 is reversed. In other words, the thyristor 36 is latched in a closed position. Further, the thyristor 36 is operable at a wide range of temperatures, and those as low as −50 degrees Celsius or lower. Regardless of the time delay element utilized, the desired range of time delay is in a range of about 0.250 seconds to 2.0 seconds, with a target delay of about 0.500 seconds to allow the clutch 22 to fully engage prior to supplying current to the DC motor 14 to prevent damage to the starter shaft 20 and/or other elements of the starter 10 or APU 12.

Figure 5:
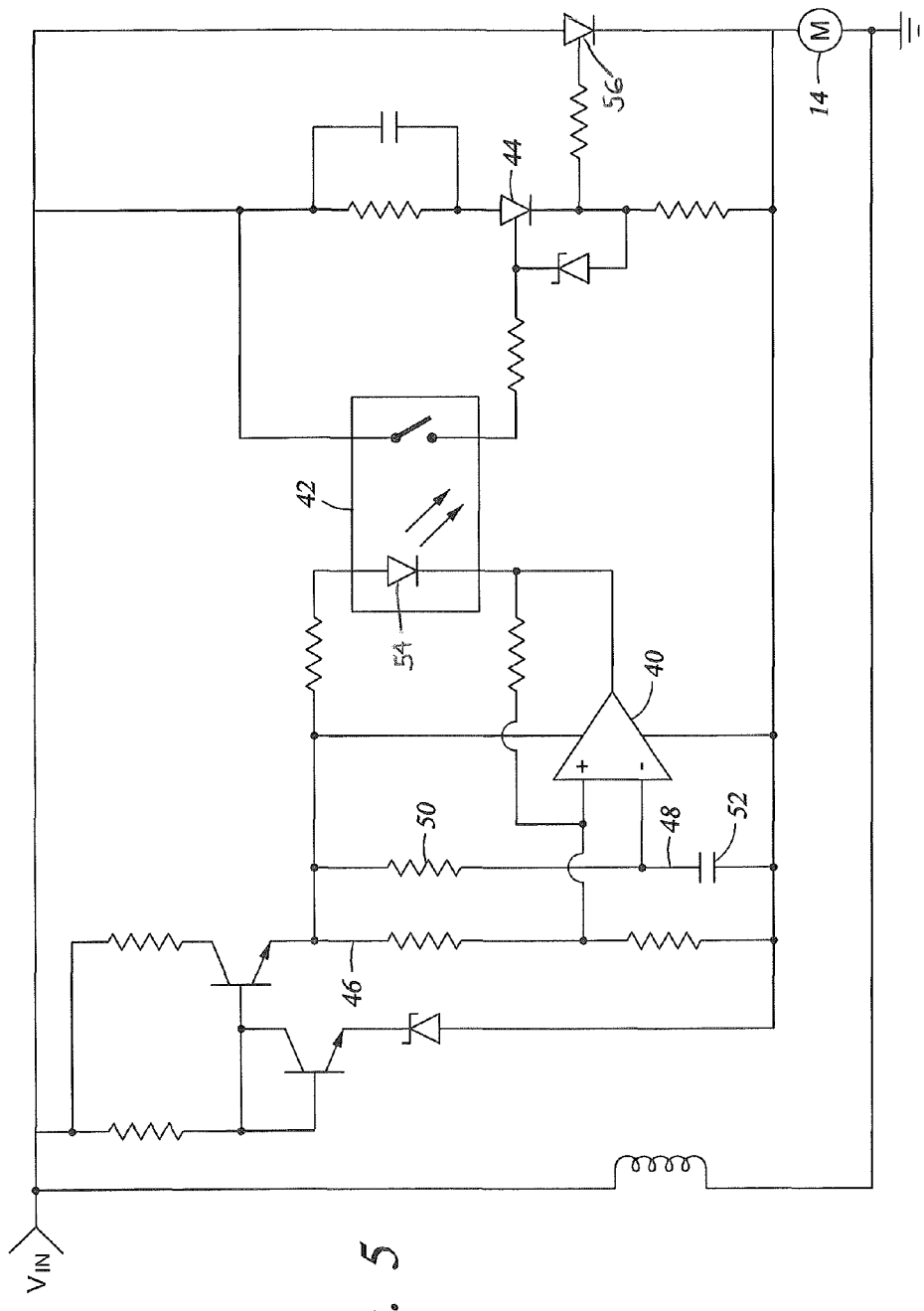
FIG. 5 is an electrical schematic of still another embodiment of a starter for an auxiliary power unit.

FIG. 5 illustrates another embodiment. Voltage $V_{in}$ is turned on via the contactors 30 (shown in FIG. 4). In this embodiment, the time delay is established via a comparator 40 which trips a relay 42 to provide power to a silicon-controlled rectifier (SCR) 44. As can be seen in FIG. 5, the relay 42 may be an optically driven relay with an internal light emitting diode 54 configured to change a switch state of the relay 42. The comparator 40 compares a comparator reference voltage 46 to a time-delayed voltage 48. The time-delay is created by a resistor 50 and capacitor 52. When the time-delayed voltage 48 exceeds the reference voltage 46 the comparator 40 trips the relay 42 which, in turn energizes the SCR 44. Once the SCR 44 is triggered, current is provided to the DC motor 14. As can be seen in FIG. 5, the SCR 44 can energize a second SCR 56 in response to the SCR 44 being energized by the relay 42 to provide the current to the DC motor 14. Because of the time delay provided by the comparator 40, the current is provided to the DC motor 14 after current is provided to the clutch 22 (shown in FIG. 4) and the clutch 22 is fully engaged.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A starter for an auxiliary power unit comprising:
a direct current motor operably connectable to an auxiliary power unit;
a clutch arranged in an electrically parallel relationship and configured to operably connect the direct current motor to the auxiliary power unit when engaged, the direct current motor and the clutch powered by a common input line; and
a time delay switching element disposed and configured to delay current delivery to the direct current motor thus providing for full engagement of the clutch prior to initiation of rotation of the direct current motor, the time delay switching element including:
a comparator configured to compare a reference voltage to a time-delayed voltage; and
a relay electrically connected to the comparator and configured to trip based on the result of the comparison.

2. The starter of claim 1 further comprising a resistive element and a capacitive element disposed along a path of the time-delayed voltage to provide a time delay.

3. The starter of claim 1 further comprising a first silicon-controlled rectifier electrically connected to the relay and to the direct current motor to provide electrical current to the direct current motor in response to the relay.

4. The starter of claim 3 further comprising a second silicon-controlled rectifier electrically connected to the first silicon-controlled rectifier to provide the electrical current to the direct current motor in response to the first silicon-controlled rectifier being energized by the relay.

5. The starter of claim 1, wherein the time delay switching element is latchable in a closed position.

6. The starter of claim 1, wherein the time delay switching element is configured to provide a time delay of about 0.25 seconds to 2.0 seconds.

7. The starter of claim 6, wherein the time delay is about 0.5 seconds.

8. The starter of claim 1, wherein the clutch operably engages the direct current motor with a shaft of the auxiliary power unit.

9. The starter of claim 1, wherein the relay comprises an internal light emitting diode configured to change a switch state of the relay.

10. A method of starting an auxiliary power unit comprising:
providing a flow of electrical current to a clutch of a starter;
fully engaging the clutch via the flow of electrical current, thus operably connecting a direct current motor to the auxiliary power unit;
providing a time-delayed flow of electrical current to a comparator via a common input line with the clutch;
tripping a relay based on a comparison of a time-delayed voltage to a reference voltage at the comparator;
providing a comparator-time-delayed flow of current to the direct current motor of the starter via the tripping of the relay;
accelerating the direct current motor via the comparator-time-delayed flow of current; and
transferring rotational energy from the direct current motor to the auxiliary power unit.

11. The method of claim 10 further comprising routing the time-delayed flow of electrical current across a resistive element and a capacitive element to provide a time delay.

12. The method of claim 10 further comprising routing the comparator-time-delayed flow of current to the direct current motor via a first silicon controlled rectifier electrically connected to the relay and to the direct current motor in response to the relay.

13. The method of claim 12 further comprising routing the comparator-time-delayed flow of current to the direct current motor via a second silicon controlled rectifier electrically connected to the first silicon controlled rectifier, wherein the first silicon controlled rectifier energizes the second silicon controlled rectifier in response to the first silicon-controlled rectifier being energized by the relay.

14. The method of claim 10, wherein the comparator-time-delayed flow of current delays electrical current to the direct current motor by about 0.25 seconds to 2.0 seconds.

15. The method of claim 14, wherein the comparator-time-delayed flow of current delays the electrical current to the direct current motor by about 0.5 seconds.

16. The method of claim 10 further comprising operably engaging the direct current motor with a shaft of the auxiliary power unit via engagement of the clutch.

17. The method of claim 10, wherein the relay comprises an internal light emitting diode configured to change a switch state of the relay.

* * * * *